United States Patent [19]

Pattantyus-Abraham et al.

[11] 4,008,467
[45] Feb. 15, 1977

[54] POWER LINE CARRIER COMMUNICATION SYSTEM HAVING EFFICIENT CARRIER SIGNAL COUPLING OF DISTRIBUTION SECONDARY LINES

[75] Inventors: Tamas I. Pattantyus-Abraham, Wilkins Township; Ian A. Whyte, Churchill Borough, both of Pa.

[73] Assignee: Westinghouse Electric Corporation, Pittsburgh, Pa.

[22] Filed: Sept. 16, 1975

[21] Appl. No.: 613,835

[52] U.S. Cl. .............................. 340/310 A; 307/11
[51] Int. Cl.² ....................................... H04M 11/04
[58] Field of Search ..... 340/310 R, 310 A, 310 CP; 307/19, 30, 11, 12, 36, 37; 179/170 J

[56] References Cited

UNITED STATES PATENTS

| | | | |
|---|---|---|---|
| 2,113,708 | 4/1938 | Parrott | 340/310 R |
| 2,294,735 | 9/1942 | Du Mont | 340/310 R |
| 3,693,155 | 9/1972 | Crafton | 340/310 R |
| 3,942,168 | 3/1976 | Whyte | 340/310 R |

*Primary Examiner*—John W. Caldwell
*Assistant Examiner*—James J. Groody
*Attorney, Agent, or Firm*—R. W. Smith

[57] ABSTRACT

An arrangement of components for a distribution line communication system. Two or more independent secondary distribution lines are connected, through distribution transformers, to a primary distribution line. Carrier communication signals are transferred between the primary distribution line and one of the secondary distribution lines by a repeater located near one of the transformers. The carrier communication signals are propagated directly along this secondary distribution line and through associated service lines to communications terminals located near the electrical loads. Coupling apparatus is connected between the two independent secondary distribution lines to provide a path for the communication signals between the repeater and the communications terminals associated with the other secondary distribution line. The coupling apparatus provides a low-impedance path for the communication signals and a high-impedance path for signals at conventional electrical power frequencies.

6 Claims, 4 Drawing Figures

POWER LINE CARRIER COMMUNICATION SYSTEM HAVING EFFICIENT CARRIER SIGNAL COUPLING OF DISTRIBUTION SECONDARY LINES

BACKGROUND OF THE INVENTION

1. Field of the Invention

This invention relates, in general, to power line carrier communication systems and, more specifically, to component arrangements for carrier communications over secondary distribution lines.

2. Description of the Prior Art

Carrier communication systems have been used on high voltage power transmission lines for a number of years. Recently, much interest has developed concerning the use of carrier communications along the primary and secondary power distribution lines. The recent interest in such systems has been prompted by the desire to obtain more knowledge about the electrical power being used at the customer location and as a means for controlling certain parameters of that power usage.

Tests have indicated that the optimum frequency bands for carrier transmission along the primary and secondary distribution lines are different. Thus, it has been found desirable to translate the carrier frequencies between the primary and secondary distribution lines. In addition to translating carrier frequencies, it has been found that, due to the high attenuation of distribution transformers to carrier communication signals, a repeater connected to the primary and secondary distribution lines enhances the effectiveness of the carrier communication system. Thus, systems have been disclosed which use a coupler or repeater-translator around each distribution transformer in the portion of the electrical power system on which communications is desired.

While such repeaters provide reliable carrier communication systems, the economy of such systems sometimes suffers due to inefficient use of the repeaters. Each repeater is capable of repeating or translating carrier communication signals to and from a number of customer load locations. A conventional repeater is able to serve up to sixteen customer loads. However, many secondary distribution lines do not serve the number of customer loads which can be served by the repeater. Actually, some secondary distribution lines serve only one customer when this customer requires a large amount of power. Therefore, with conventional secondary distribution power line arrangements, many of the distribution transformer repeaters can not be fully used to their capacity.

Secondary distribution power lines are arranged in many different patterns, usually with one distribution transformer connected to each separate or independent secondary distribution line. Although separate secondary distribution lines may be connected to the same supporting structure for stability and proper guying requirements, the separate distribution lines are not electrically connected together for power transmission. Therefore, according to conventional arrangements, a repeater is required to be connected around each distribution transformer associated with each separate secondary distribution line, although the associated secondary distribution line may be serving less than the total number of customer loads which the repeater is capable of serving.

In other secondary distribution line arrangements, the distribution lines may run parallel to each other for a considerable distance. However, such secondary distribution lines are connected through separate distribution transformers to the primary distribution line. This type of arrangement also does not make full use of the repeaters around the distribution transformers when less than the full capacity of loads is being served by a repeater. Therefore, it is desirable, and it is an object of this invention, to provide a power line carrier communication system which provides economical use of the repeaters located at the distribution transformers.

SUMMARY OF THE INVENTION

There are disclosed herein new and useful arrangements for a power line carrier communication system wherein the distribution transformer repeaters are efficiently utilized. Enough separate secondary distribution lines are effectively connected together by a suitable coupling device to allow a repeater which is located around a distribution transformer to function at or near capacity. In distributions systems where the ends of the secondary distribution lines come together at the same pole or supporting structure, the coupling device is conveniently connected between the ends of the separate secondary distribution lines. In power distribution systems where the secondary distribution lines run substantially parallel to each other for part of the system and are connected to the same primary distribution line by separate distribution transformers, the coupling device is connected between the secondary distribution lines at a location where they are adjacent to each other. Thus, with either type of system, one of the repeaters can be eliminated.

A suitable coupling device provides a low-attenuation path for the carrier communication signals and a high-attenuation path at electrical power frequencies. In one embodiment of the invention, a capacitive element is connected between appropriate conductors of the separate secondary distribution lines. Due to the relationship of the reactance of a capacitor with frequency, the relatively high-frequency carrier communication signal is freely transferred from one secondary distribution line to the other. Due to the high reactance of the capacitor at relatively low frequencies, the secondary distribution line electrical voltages are substantially isolated from each other. In another embodiment of the invention, a form of transformer coupling is used to additionally isolate the electrical power signals between the separate secondary distribution lines.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
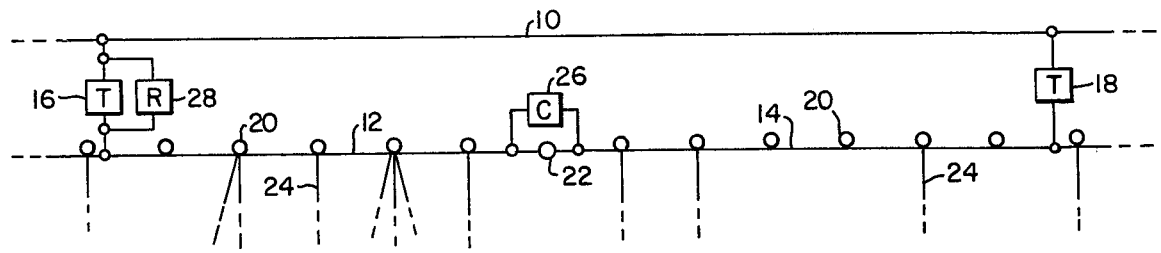
FIG. 1 is a schematic view of one type of distribution system using the teachings of this invention.

Throughout the following description, similar reference characters refer to similar elements or members in all of the figures of the drawing.

Refering now to the drawing, and to FIG. 1 in particular, there is shown a power distribution system which has components arranged for carrier communications according to this invention. The primary distribution line 10 is connected to the separate secondary distribution lines 12 and 14 by the distribution transformers 16 and 18. The secondary distribution lines 12 and 14 are attached to the poles or supporting structures 20. An end of each separate secondary distribution line is also connected to a common pole or supporting structure 22. The secondary distribution lines 12 and 14 are not connected together at the pole 22 for the transfer of electrical power, but are coupled together by the coupling device 26 for the purpose of providing a transmission path between the secondary distribution lines for the carrier communication signals.

The secondary distribution lines 12 and 14 are connected to various drop or service lines 24 which are ultimately connected to an electrical load at a customer location and to a communications terminal positioned substantially at the electrical load. Carrier communication signals existing on the primary distribution line 10 are transferred, around the distribution transformer 16 by the repeater 28, to the secondary distribution line 12. From this location, the carrier communication signals are directly transferred to the communications terminals located at the electrical loads associated with the service lines 24. In addition, due to the coupling device 26, the carrier communication signals which are transferred by the repeater 28 are applied to the secondary distribution line 14 and to the communications terminals associated with the drop lines 24. Thus, communication signals between the primary distribution line 10 and all of the communications terminals associated with the secondary distribution lines 12 and 14 are directed through the repeater 28 which is associated with the distribution transformer 16. Thus, a similar repeater is not required to be connected around the distribution transformer 18, thereby reducing the number of required repeaters to one-half that required by prior art arrangements which do not have any separate secondary distribution lines interconnected for carrier communication signals.

The system arrangement shown in FIG. 1 is only illustrative of an arrangement which may use the teachings of this invention. Other arrangements may be used without departing from the scope of the invention. For example, more than two separate secondary distribution lines may be interconnected by one or more suitable coupling devices to transfer the carrier communication signals between the separate secondary distribution lines. In addition, more or less service lines than are illustrated in FIG. 1 may be connected to the separate secondary distribution lines. Also, the ends of the separate secondary distribution lines 12 and 14 need not come together at the same pole or supporting structure 22. For example, the ends of the separate secondary distribution lines could be located several poles apart, and interconnected through the coupling device 26 by a suitable cable for conducting the carrier communication signals.

Figure 2:
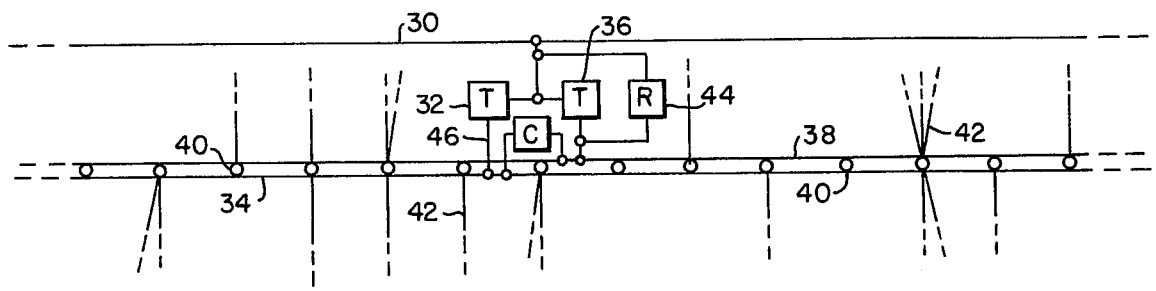
FIG. 2 is a schematic view of another type of power distribution system using the teachings of this invention.

FIG. 2 is a view illustrating another type of power distribution system which uses the teachings of this invention. The primary distribution power line 30 is connected, through the distribution transformer 32, to the secondary distribution power line 34. Similarly, the primary distribution power line 30 is connected, through the distribution transformer 36, to the secondary distribution line 38. Although the secondary distribution lines 34 and 38 are adjacent to each other and are connected to the same poles or supporting structures 40 for a substantial amount of their length, the two secondary distribution lines are electrically separate when considering the transfer of electrical power at conventional power frequencies. The drop or service lines 42 illustrate a typical arrangement for connecting customer electrical loads and communications terminals to the secondary distribution lines 34 and 38.

The communication signals on the primary distribution line 30 are transferred, around the distribution transformer 36 by the repeater 44, to the secondary distribution line 38. Similarly, communication signals from the distribution line 38 are transferred through the repeater 44 to the primary distribution line 30. The coupling device 46, which may be constructed similar to the coupling device 26 shown in FIG. 1, suitably connects the secondary distribution lines 34 and 38 together to transfer communication signals between these distribution lines. Thus, the communications path between the secondary distribution line 34 and the primary distribution line 30 extends through the coupling device 46 and the repeater 44. Therefore, only one repeater is required for the two distribution transformers 32 and 36 when the coupler 46 is used according to this invention.

Figure 3:
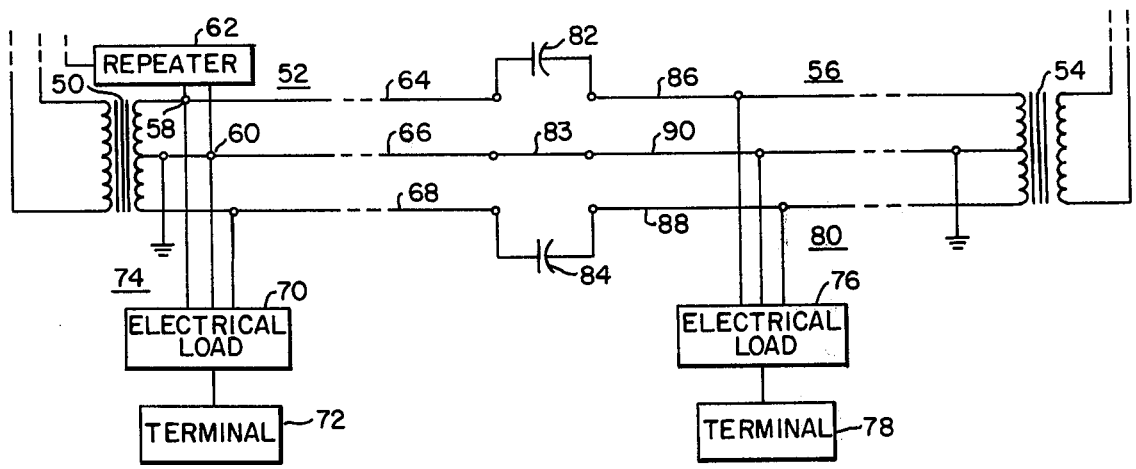
FIG. 3 is a schematic diagram of a means for coupling together separate secondary distribution lines according to one embodiment of this invention.

FIG. 3 is a diagram illustrating an arrangement for interconnecting separate secondary distribution lines according to one embodiment of this invention. The distribution transformer 50 connects the secondary distribution line 52 to a primary distribution line, which is not shown. Similarly, the distribution transformer 54 connects the secondary distribution line 56 to the same unshown primary distribution line. The repeater 62 transfers communication signals between the primary distribution line and the terminals 58 and 60 of the secondary distribution line 52. Terminals 58 and 60 are associated with one-half of the secondary winding of the transformer 50. Thus, the communication signals are primarily confined to the conductors 64 and 66 of the secondary distribution line 52. However, other connecting arrangements may be used within the contemplation of this invention and, even with the connections illustrated in FIG. 3, some of the carrier communication signals are carried by the conductor 68 due to inductive coupling. A service line 74 is also connected to the secondary distribution line 52 and to the customer load 70. A communications terminal 72, which is located near the customer load 70, is appropriately connected to the conductors of the service line 74 for receiving and transmitting communication signals over the distribution power line system.

The customer load 76 and the communications terminal 78 are connected to the end of the service line 80 which is connected to the secondary distribution line 56. Although only one load and communications terminal is shown connected to each secondary distribution line in FIG. 3, it should be obvious that additional loads and communications terminals could be connected to the secondary distribution lines through other service lines. The load 76 receives its electrical energy through the distribution transformer 54 and the load 70 receives its electrical energy through the distribution transformer 50. Therefore, as far as the distribution of electrical energy for power consumption is concerned, the secondary distribution lines 52 and 56 are electrically independent or separate.

The secondary distribution lines 52 and 56 are interconnected for communication purposes by the capacitors 82 and 84. The capacitor 82 provides a communications path between the conductors 64 and 86, which are the main non-grounded conductors for transferring communication signals through the secondary distribution line. The capacitor 84 connects together the conductors 68 and 88 and would be used when an appreciable amount of signal has been coupled to the conductor 68 of the secondary distribution line 52. Since the conductors 66 and 90 are directly connected to ground, and/or connected together by a conductor such as jumper 83, there is not any need for a capacitor to be connected therebetween to provide a return circuit for the communication signals conducted through the other conductors of the secondary distribution lines.

The capacitors 82 and 84 have a high reactance at the power line frequency, which is usually 60 Hz. Therefore, relatively little electrical energy or voltage is transferred between the secondary distribution lines 52 and 56, and they may be considered as separate and independent as far as the electrical distribution of energy is concerned. However, the reactance of the capacitors 82 and 84 is substantially low at the frequency of the communications carrier, which is normally above 30 KHz. Thus, a relatively low-attenuation path is provided between the secondary distribution line 52 and the secondary distribution line 56 for the transfer of communication signals at the carrier frequency. Therefore, the communications terminals associated with both the secondary distribution lines 52 and 56 can be served by the single repeater 62, thereby eliminating the need for a repeater around the distribution transformer 54. Thus, the efficiency and economic use of the communication equipment is enhanced.

Figure 4:
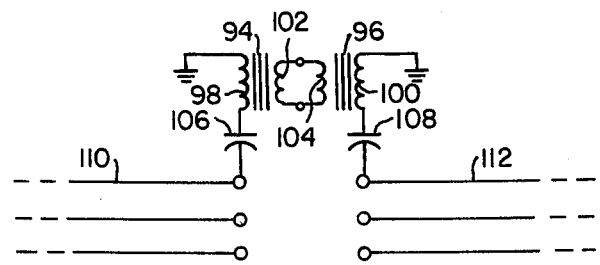
FIG. 4 is a schematic diagram of a means for coupling together separate secondary distribution lines according to another embodiment of this invention.

FIG. 4 is a schematic diagram of a coupling arrangement constructed according to another embodiment of this invention. The components shown in FIG. 4 may be substituted for the capacitors 82 and 84 shown in FIG. 3. The other components of the secondary distribution line system may be similar to those shown in FIG. 3.

The coupling transformers 94 and 96 include the primary windings 98 and 100 and the secondary windings 102 and 104. The primary winding 98 is connected to ground and, through the coupling capacitor 106, to the conductor 110. Similarly, the primary winding 100 is connected to ground and, through the coupling capacitor 108, to the conductor 112. In addition, the secondary windings 102 and 104 are directly connected together. Therefore, voltages developed across the primary windings of either coupling transformer will be induced in the other windings of the transformers and coupled to the secondary distribution line conductors.

Due to both the capacitive reactance of the capacitors 106 and 108, and to the inductive reactance of the windings 98 and 100, the electrical isolation between the two separate secondary distribution lines is better than that provided by the arrangement shown in FIG. 3. Therefore, the 60 Hz electrical power signals must traverse a relatively high-attenuation path to transfer from one secondary distribution line to the other. At the frequency of the carrier communication signals, the reactance of the capacitors is relatively low and the reactance of the primary windings 98 and 100 is relatively high. Thus, most of the carrier communication signal voltage is developed across the windings of the coupling transformers and is transferred, through a low-attenuation path, between the separate secondary distribution lines.

Since numerous changes may be made in the above-described apparatus, and since different embodiments of the invention may be made without departing from the spirit thereof, it is intended that all of the matter contained in the foregoing description, or shown in the accompanying drawing, shall be interpreted as illustrative rather than limiting.

We claim as our invention:

1. A power line carrier communication system for communicating with first and second electric power customer locations separately served by first and second distribution transformers, respectively, of a distribution line system, said communication system comprising:

a primary distribution line transmitting carrier signals having a substantially greater frequency than the frequency of electric power also conducted therein;

means commonly connecting said first and second distribution transformers to said primary distribution line;

first and second independent secondary distribution lines each including grounded and ungrounded conductors supported adjacent the conductors of the other line at at least one location, and being connected to said first and second distribution transformers, respectively;

means for transferring said carrier signals only around said first distribution transformer;

means for connecting a first electrical load at said first customer location to said first secondary distribution line and a second electrical load at said second customer location to said second secondary distribution line;

first and second communications terminals respectively coupled to first and second secondary distribution lines near the electrical loads at said first and second customer locations, said terminals operating at the carrier signal frequency; and means for interconnecting said first and second secondary distribution lines at the adjacently supported location, said interconnecting means providing a substantially low-attenuation path between the secondary distribution lines for signals at the carrier frequency, and providing a substantially high-attenuation path between the secondary distribution lines for signals at the power frequency thereby being effective to transfer the carrier signals between said primary distribution line and said second communication terminal while the associated second electrical load is maintained in a separately connected relationship to said second distribution transformer.

2. The system of claim 1 wherein one of the ends of each of the conductors of said first and second secondary distribution lines are adjacently supported and wherein the means for interconnecting the secondary distribution lines includes a capacitor connected in series circuit relationship between the adjacent conductor ends of the secondary distribution line conductors.

3. The system of claim 1 wherein the means for interconnecting the secondary distribution lines includes a capacitor connected between a non-grounded conductor of one secondary distribution line and a non-grounded conductor of the other secondary distribution line.

4. The system of claim 1 wherein the means for interconnecting the secondary distribution lines includes first and second windings which are inductively coupled to each other, said first winding being capacitively coupled to the first secondary distribution line, and the second winding being capacitively coupled to the second secondary distribution line.

5. The system of claim 1 wherein the means for interconnecting the secondary distribution lines includes a first coupling transformer having primary and secondary windings, a second coupling transformer having primary and secondary windings, and first and second capacitors, with the secondary windings of the first and second coupling transformers connected together, the primary windings of the first coupling transformer and the first capacitor serially connected between ground and one of the non-grounded conductors of the first secondary distribution line, and the primary winding of the second coupling transformer and the second capacitor serially connected between ground and one of the non-grounded conductors of the second secondary distribution line.

6. A power line carrier communication system comprising:

a primary distribution line transmitting carrier frequency signals;

first and second distribution transformers connected to said primary distribution line;

first and second independent secondary distribution lines having an adjacent support location and being respectively connected between said first and second distribution transformers and first and second customer locations;

a first electrical load connected to the first secondary distribution line at said first customer location and a second electrical load connected to the second secondary distribution line at said second customer location;

first and second communications terminals respectively coupled to the first and second secondary distribution lines at said first and second customer locations near the associated electrical loads, said terminals operating at the carrier frequencies which are substantially greater than the frequency of the electrical power on the distribution lines;

a repeater connected around said first distribution transformer and between the primary distribution line and the first secondary distribution line, said repeater providing an efficient path at the carrier signal frequencies for two-way communications between the primary and first secondary distribution lines; and means for interconnecting said first and second secondary distribution lines, said interconnecting means providing a substantially low-attenuation path between the secondary distribution lines for signals at the carrier frequency, and providing a substantially high-attenuation path between the secondary distribution lines for signals at the power frequency so that said second communications terminal is coupled at the carrier frequencies to said primary distribution line via said repeater and said first distribution transformer while said second electrical load remains independently connected to said second distribution transformer at the electrical power frequency.

* * * * *